United States Patent
Otaka et al.

(10) Patent No.: US 8,085,069 B2
(45) Date of Patent: Dec. 27, 2011

(54) STARTING APPARATUS AND STARTING METHOD

(75) Inventors: Shoji Otaka, Yokohama (JP); Toshiyuki Umeda, Inagi (JP); Shigeyasu Iwata, Hamura (JP); Takafumi Sakamoto, Machida (JP); Tsuyoshi Kogawa, Kawasaki (JP); Koji Ogura, Tachikawa (JP); Makoto Tsuruta, Kawasaki (JP); Yu Kaneko, Yokohama (JP); Nobuhiko Sugasawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 177 days.

(21) Appl. No.: 12/560,609

(22) Filed: Sep. 16, 2009

(65) Prior Publication Data

US 2010/0164564 A1    Jul. 1, 2010

(30) Foreign Application Priority Data

Dec. 25, 2008   (JP) ................ P2008-331296

(51) Int. Cl.
*H03L 7/00*   (2006.01)
(52) U.S. Cl. ........ 327/142; 327/144; 327/198; 455/41.1
(58) Field of Classification Search .......... 327/142, 327/143, 198; 455/39–48, 59–90
See application file for complete search history.

(56) References Cited

U.S. PATENT DOCUMENTS

| | | | | |
|---|---|---|---|---|
| 6,163,204 A | * | 12/2000 | Mantov | 327/531 |
| 7,313,358 B1 | * | 12/2007 | Ricci | 455/1 |
| 7,424,265 B2 | * | 9/2008 | Umeda et al. | 455/41.1 |
| 7,840,181 B2 | * | 11/2010 | Umeda et al. | 455/41.1 |
| 2007/0281657 A1 | * | 12/2007 | Brommer et al. | 455/334 |
| 2008/0158926 A1 | | 7/2008 | Umeda et al. | |
| 2008/0318523 A1 | | 12/2008 | Umeda et al. | |
| 2009/0184690 A1 | | 7/2009 | Otaka et al. | |
| 2009/0318102 A1 | * | 12/2009 | Someya | 455/193.1 |

FOREIGN PATENT DOCUMENTS

JP   2001-156788   6/2001

* cited by examiner

*Primary Examiner* — Lincoln Donovan
*Assistant Examiner* — Brandon Cole
(74) *Attorney, Agent, or Firm* — Turocy & Watson, LLP

(57) ABSTRACT

A starting apparatus includes: a storage unit storing an identifier; a rectifying unit rectifying a reception signal; a generating unit comparing the reception signal rectified in the rectifying unit to a reference signal and generating a digital signal from the reception signal; a judging unit judging whether or not the digital signal contains information of the identifier; a reference changing unit changing the reference signal when the judging unit judges that the reception signal does not contain information of the identifier; and a start instructing unit instructing start of an electric appliance when the judging unit judges that the reception signal contains information of the identifier.

19 Claims, 9 Drawing Sheets

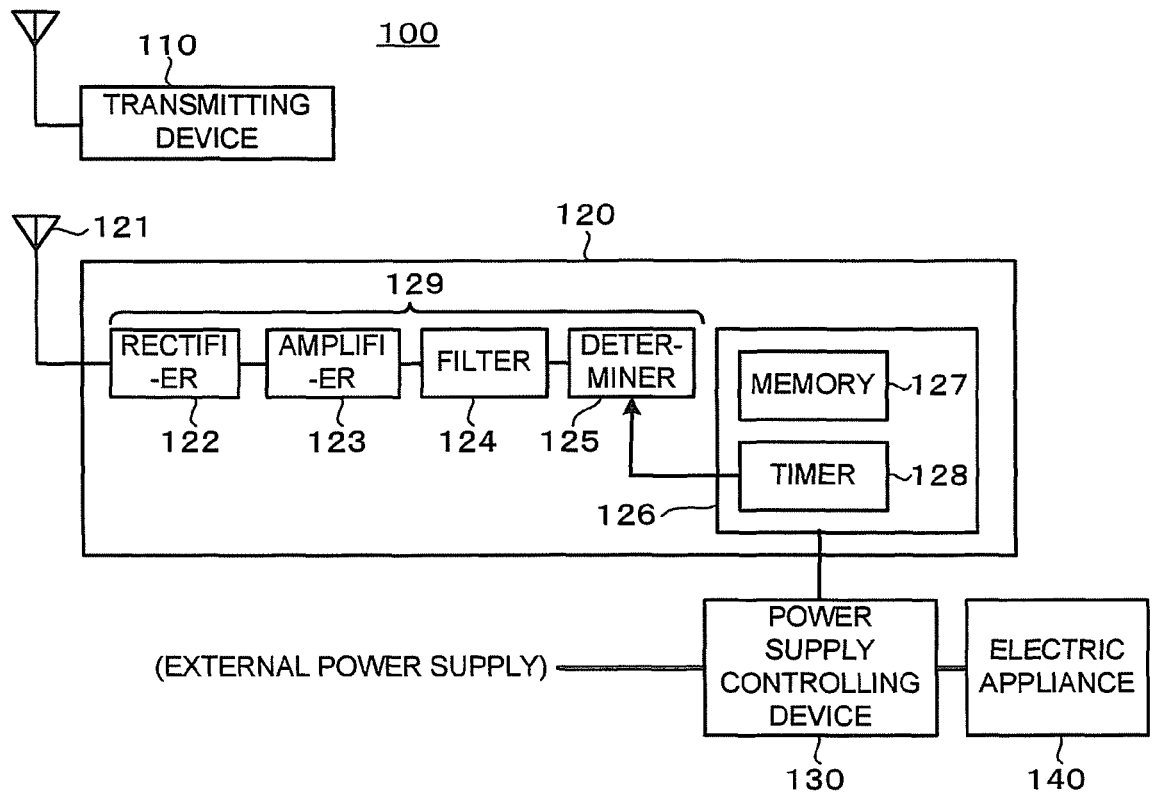

US 8,085,069 B2

STARTING APPARATUS AND STARTING METHOD

CROSS-REFERENCE TO RELATED APPLICATIONS

This application is based upon and claims the benefit of priority from the prior Japanese Patent Application No. 2008-331296, filed on Dec. 25, 2008; the entire contents of which are incorporated herein by reference.

BACKGROUND OF THE INVENTION

1. Field of the Invention

The present invention relates to a starting apparatus and a starting method each for starting electric appliance and apparatus.

2. Description of the Related Art

Wireless LAN system using a radio base station and a radio terminal is used. To reduce the power consumption of the radio base station, disclosed is a technique of stopping most of functions of the radio base station when the communication with the terminal is disrupted for a predetermined time (see JP-A 2001-156788 (KOKAI)). When the communication with the terminal is disrupted for a predetermined time, power is supplied only to a part of blocks of the radio base station, but not supplied to other blocks. The radio base station receives a Wake Up signal, whereby the power is supplied to the other blocks. Here, in order to accurately recognize the Wake Up signal even in circumstances where an interference wave exists, the reception level is set to a predetermined level or higher.

However, the above technique does not teach any method of setting a reference level for detecting the signal for start (for example, a Wake Up signal). If the reference level is set too high, the stop of power supply to the other blocks is continued. Conversely, if the reference level is set too low, power is supplied to the other blocks due to an interference wave. As described above, the reliability of control of the power supply is decreased unless the predetermined level is appropriately set.

BRIEF SUMMARY OF THE INVENTION

An object of the present invention is to provide a starting apparatus and a starting method in which the reliability of detection of a start signal is improved.

A starting apparatus according to an aspect of the present invention includes: a storage unit storing an identifier; a rectifying unit rectifying a reception signal; a generating unit comparing the reception signal rectified in the rectifying unit to a reference signal and generating a digital signal from the reception signal; a judging unit judging whether or not the digital signal contains information of the identifier; a reference changing unit changing the reference signal when the judging unit judges that the reception signal does not contain information of the identifier; and a start instructing unit instructing start of an electric appliance when the judging unit judges that the reception signal contains information of the identifier.

A starting method according to an aspect of the present invention includes: rectifying a reception signal; comparing the rectified reception signal to a reference signal and generating a digital signal from the reception signal; judging whether or not the digital signal contains information of a predetermined identifier; changing the reference signal when the it is judged that the reception signal does not contain information of the identifier; and instructing start of an electric appliance when it is judged that the reception signal contains information of the identifier.

BRIEF DESCRIPTION OF THE DRAWINGS

FIG. 1 is a block diagram showing an electric appliance starting system 100 according to a first embodiment.

FIG. 2 is a list showing examples of the input level at an analog front end part 129 of a receiving device 120.

DETAILED DESCRIPTION OF THE INVENTION

Figure 3:
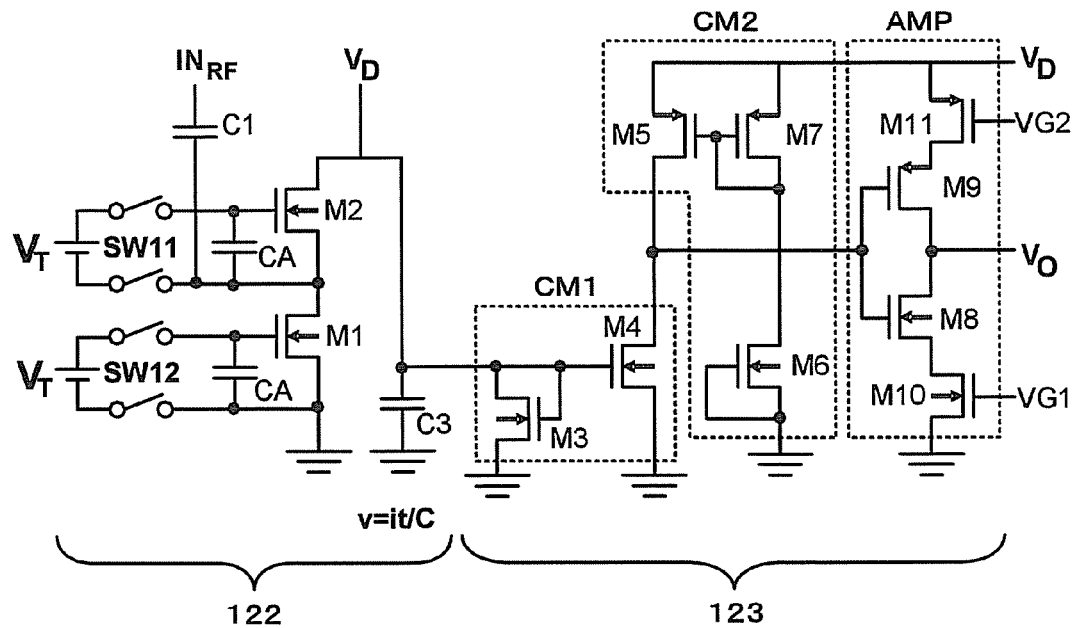
FIG. 3 is a circuit diagram showing examples of a rectifier 122 and an amplifier 123.

Hereinafter, an electric appliance starting system according to embodiments of the present invention will be described with reference to the drawings.

First Embodiment

FIG. 1 is a block diagram showing an electric appliance starting system 100 according to a first embodiment of the present invention. The electric appliance starting system 100 includes a transmitting device 110, a receiving device 120, a power supply controlling device 130, and an electric appliance 140.

The transmitting device 110 is, for example, a remote controlling device using a radio wave (hereinafter, described as a radio remote controller). The receiving device 120, which works as a starting apparatus, receives a transmission signal (a start signal or the like) from the transmitting device 110, and instructs start of the electric appliance 140 (output of an instruction signal) when the receiving device 120 judges that it has received the start signal. The power supply controlling device 130 turns on/off the connection between the electric appliance 140 and an external power supply in response to the instruction signal from the receiving device 120. As a result, the electric appliance 140 is started. The electric appliance 140 is a general electric appliance, for example, a television receiving set. The electric appliance starting system 100 can be used as a data communication system which performs start of a household electric appliance or the like (the electric appliance 140) and data communication after the start using a radio remote controller (the transmitting device 110).

The transmission signal (the start signal or the like) transmitted from the transmitting device 110 to the receiving device 120 employs on-off keying. More specifically, digital information (High state (1)/Low state (0)) is expressed according to the presence/absence of power of the transmission signal (presence/absence of transmission). By temporally changing the presence/absence of transmission of the transmission signal, a signal of a plurality of bits can be transmitted. The receiving device 120 can detect the signal of plural bits based on the temporal change of the presence/absence of power of the reception signal.

Here, an interference wave may be superposed on the transmission signal (a desired signal) from the transmitting device 110 and received by the receiving device 120. For instance, when a person operating the transmitting device 110 (the radio remote controller) is talking on a mobile phone, the receiving device 120 receives both the radio wave (the desired wave) from the transmitting device 110 and the radio wave (the interference wave) from the mobile phone. Especially when the difference between the frequencies of the radio waves emitted respectively from the transmitting device 110 and the mobile phone is small, it is difficult to cut off the radio wave from the mobile phone by a later-described filter 124 of the receiving device 120. Further, when the receiving device 120 does not include the filter 124 for the reason of reduction in price or the like of the receiving device 120, it is difficult to cut off the radio wave from the mobile phone even if the difference in frequency is large. In these cases, the receiving device 120 will receive the desired wave together with the interference wave from the mobile phone and cannot correctly receive the desired wave. In this case, appropriate setting of the reception level is difficult because the level of the interference wave is unobvious.

Here, the effects of the interference wave on reception of the desired wave will be described. It is assumed that the frequency of the interference wave is fu and its amplitude is A, and the frequency of the desired wave is fD and its amplitude is k·A. The received power when only the interference wave exists is $(A^2/2)$, whereas the received power when both the interference wave and the desired wave exist is $(\{1+k^2\} \cdot A^2/2)$.

If the power of the interference wave itself is known, detection of the desired wave is possible even when the power of the desired wave is smaller than the power of the interference wave (even when k is smaller than 1). A rectifier 122 generally generates an output voltage corresponding to (for example, proportional to) the received power, so that by sensing the output of the rectifier 122, the signal of the desired wave can be sensed irrespective of the presence/absence of the interference wave. Here, it is assumed that the output voltage of the rectifier 122 when only the interference wave exists is A/SQR (2). In this case, the output voltage when the interference wave and the desired wave exist is SQR $(k^2+1)$·A/SQR(2). By setting a threshold value (an offset voltage) between these two values, the desired wave can be detected.

On the other hand, the receiving device 120 may judge that the desired wave reaches thereto when it receives only the interference wave. To prevent such a situation, the presence/absence of the signal addressed to the electric appliance 140 is judged according to an identifier (hereinafter, referred to as an ID) assigned to the electric appliance 140 or the receiving device 120 performing the start control of the electric appliance 140. In order to receive the desired wave in presence of the interference wave, identification of the ID and sensing of the magnitude of the interference wave are effective. Details thereof will be described below. The start signal contains an ID and information instructing start.

The receiving device 120 includes an antenna 121, the rectifier 122, an amplifier 123, the filter 124, a determiner 125, and a controlling unit 126. The rectifier 122 to the determiner 125 constitute an analog front end part 129 of the receiving device 120 which processes the reception signal as an analog signal.

The antenna 121 receives radio signals (the desired wave and the interference wave).

The rectifier 122 rectifies the radio signal (the reception signal) received by the antenna 121.

The amplifier 123 amplifies the reception signal rectified in the rectifier 122. As will be described later, the amplifier 123 has a gain control function.

The filter 124 is a band-pass filter or a low-pass filter for reducing the signal at a frequency that is different from the frequency of the desired wave. In other words, the filter 124 may not necessarily cut off the signal at a low frequency. The filter 124 can be composed, for example, of only a capacitor or of a resistor and a capacitor. However, the filter 124 is not limited to that configuration.

The determiner 125 judges that the reception signal passed through the filter 124 is H (High) or L (Low), and generates a digital signal (analog-digital conversion). In other words, the determiner 125 judges that the reception signal is H (1) or L (0) by comparing the reception signal to the offset voltage (a reference signal, a reference voltage). When the voltage of the reception signal is higher than the offset voltage, the reception signal is judged to be in the H (1) state. When the voltage of the reception signal is lower than the offset voltage, the reception signal is judged to be in the L (0) state. Here, the offset voltage of the determiner 125 can be changed. By adjusting the offset voltage, the determiner 125 can deal with the change in magnitude of the interference wave.

The determiner 125 functions as a generating unit which compares the reception signal rectified in a rectifying unit to the reference signal and generates a digital signal from the reception signal.

The controlling unit 126 authenticates the ID based on the reception signal and analyzes data. The controlling unit 126 controls the amplifier 123 and the determiner 125. The controlling unit 126 can control the gain of the amplifier 123 and the offset voltage of the determiner 125.

The controlling unit 126 functions as the following judging unit, reference changing unit, start instructing unit, gain reducing unit, and gain increasing unit.

The judging unit judging whether or not the digital signal contains information of the identifier.

The reference changing unit changing the reference signal when the judging unit judges that the reception signal does not contain information of the identifier.

In this case, the reference signal can be changed based on the strength of the reception signal. For instance, the strength of the reference signal is changed such that the strength of the reference signal is increased as the strength of the reception signal is increased. Note that the reference changing unit changes the reference signal after the gain is increased by the gain increasing unit.

The start instructing unit instructing start of the electric appliance when the judging unit judges that the reception signal contains info/nation of the identifier.

The gain reducing unit reducing the gain of the amplifying unit or the rectifying unit when the strength of the reference signal changed by the reference changing unit is equal to or greater than a predetermined value.

The gain increasing unit increasing the gain of the amplifying unit or the rectifying unit when the strength of the reference signal changed by the reference changing unit is greater that a predetermined second value.

The controlling unit 126 includes a memory 127 and a timer 128. The memory 127 stores the ID. The memory functions as a storage unit storing the identifier. The timer 128 measures the time interval.

FIG. 2 is a list showing examples of the input level at the analog front end part 129 of the receiving device 120. Here, it is assumed that the rectifier 122 outputs a voltage corresponding to the square of input voltage. Namely, it is assumed that when the input voltage increases by 10 dB, the output voltage increases by 20 dB.

Suppose that a desired wave with a power of −60 dBm is inputted from the antenna 121. Where the gains of the amplifier 123 and the filter 124 are 10 times and 1 time, respectively, the voltages of the signals outputted respectively from the rectifier 122, the amplifier 123, and the filter 124 (the voltages of the signals inputted into the amplifier 123, the filter 124, and the determiner 125, respectively) are 0.2 mV, 2 mV, and 2 mV.

When an interference wave with a power of −40 dBm is inputted from the antenna 121, the voltages outputted respectively from the rectifier 122, the amplifier 123, and the filter 124 are 20 mV, 200 mV, and 200 mV. When an interference wave with a power of −30 dBm is inputted from the antenna 121, the voltages outputted respectively from the rectifier 122, the amplifier 123, and the filter 124 are 200 mV, 2V, and 2V.

The offset voltage is adjusted such that when the determiner 125 determines the presence/absence of application of a voltage of 2 mV, 1 mV is set as the threshold voltage. When the initial value of the offset voltage is 0 mV, the offset voltage is set to 1 mV. When the initial value of the offset voltage is −2 mV, the offset voltage is set to 3 mV as 1 mV required for determination of the presence/absence of application of voltage is added to +2 mV for compensation for the offset voltage.

When an interference wave with a power of −40 dBm reaches in this case, the voltage at the input of the determiner 125 is 200 mV. Setting the voltage of 200 mV generated by the interference wave as the offset voltage of the determiner 125 enables identification of H/L of the desired wave. Namely, when the interference wave is sensed, the offset voltage of the determiner 125 is adjusted. As a result, a direct-current component generated by the interference wave is removed, so that the desired wave can be sensed. Note that the method of detecting the interference wave will be described later.

In contrast, when the power of the interference wave is −30 dBm, the voltage at the input of the determiner 125 will be 2 V. When the analog front end part 129 is composed, for example, of a CMOS, the power supply voltage needs to be set to, for example, 1.5 V or lower, and therefore compensation for the offset voltage of 2 V is difficult. As a result, reception of the desired wave is difficult.

For this reason, the gain of the amplifier 123 is reduced when the offset voltage is saturated (overflows) as will be described later. For example, if the gain of the amplifier 123 is changed to 0 dB, 200 mV is applied to the input part of the determiner 125 and the offset voltage can be compensated. Namely, the direct-current component generated by the interference wave is removed so that the desired wave can be sensed. In this case, however, the voltage of the desired wave is also decreased by 20 dB, resulting in a voltage generated by the desired wave of 0.2 mV. Accordingly, in order to detect the desired wave, −50 dBm is required as the input voltage of the desired wave. This means deterioration of the sensitivity because of countermeasures against the interference wave, but this method is still useful. Note that the method of detecting the saturation of the offset voltage will be described later.

Hereinafter, examples of the rectifier 122, the amplifier 123, and the determiner 125 will be illustrated. Note that they are not limited to those examples. FIG. 3 is a circuit diagram showing examples of the rectifier 122 and the amplifier 123.

The rectifier 122 includes transistors (FETs: Field Effect Transistors) M1 and M2, capacitors C1, CA and C3, switches SW11 and SW12, and voltage sources VT. The capacitors CA are connected between the respective gates and sources of the transistors M1 and M2. The voltages VT are connected to the capacitors CA via the switches SW11 and SW12.

The switches SW11 and SW12 are controlled by the controlling unit 126 together with a later-described switch SW2 of the determiner 125. When no signal is received, the switches SW11 and SW12 are closed to apply the voltages VT to the capacitors CA to thereby charge the capacitors CA. When a signal is received, the switches SW11 and SW12 are opened to apply the voltages of the capacitors CA between the respective gates and sources of the transistors M1 and M2. In other words, the capacitors CA function as storage batteries (voltage applying units applying control voltages between gate terminals and source terminals).

The capacitor C1 is connected between an RF input terminal $IN_{RF}$ and the source of the transistor M2. The RF input terminal $IN_{RF}$ is connected to the antenna 121. An RF signal (the reception signal) is inputted from the RF input terminal $IN_{RF}$ to the transistor M2 via the capacitor C1.

The capacitor C3 stores electric charges outputted from the transistor M2.

The transistors M1 and M2 rectify the reception signal (operate as diodes). As the magnitudes of the threshold values of the transistors M1 and M2 increase, the losses when rectifying at the transistors M1 and M2 increase. The losses can be decreased by apparently decreasing the threshold values. The capacitors CA are charged with electric charges so that voltages corresponding to the threshold voltages are generated to cancel the threshold voltages, whereby the losses can be reduced (improvement in gain).

The amplifier 123 is composed of current mirror circuits CM1 and CM2 and an amplifier AMP. The current mirror circuit CM1 includes transistors M3 and M4. The current mirror circuit CM2 includes transistors M5 to M7. The amplifier AMP includes transistors M8 to M11. The amplifier 123 operates by a drive voltage VD.

To the drain terminal of the transistor M5 (the input side of the current mirror circuit CM2), the drain terminal of the transistor M4 (the output side of the current mirror circuit CM1) is connected. On the input side of the current mirror circuit CM2, a leak current by the transistor M4 is generated. The transistor M6 functions as a leak current source used for compensating the leak current by the transistor M4. The transistor M6 is connected to the output side of the current mirror circuit CM2 to balance the leak currents on the input and output of the current mirror circuit CM2 (compensation for the leak current).

The transistors M10 and M11 are used to apparently control the mutual conductance of the transistors M8 and M9 respectively. The gain of the amplifier AMP can be controlled by gain control voltages VG1 and VG2 applied to the gates of the transistors M10 and M11. For instance, when the offset voltage of the determiner 125 is saturated, a predetermined voltage is set to reduce the gain. The amplified signal is outputted from the amplifier AMP as an output voltage Vo and inputted to the filter 124.

Figure 4:
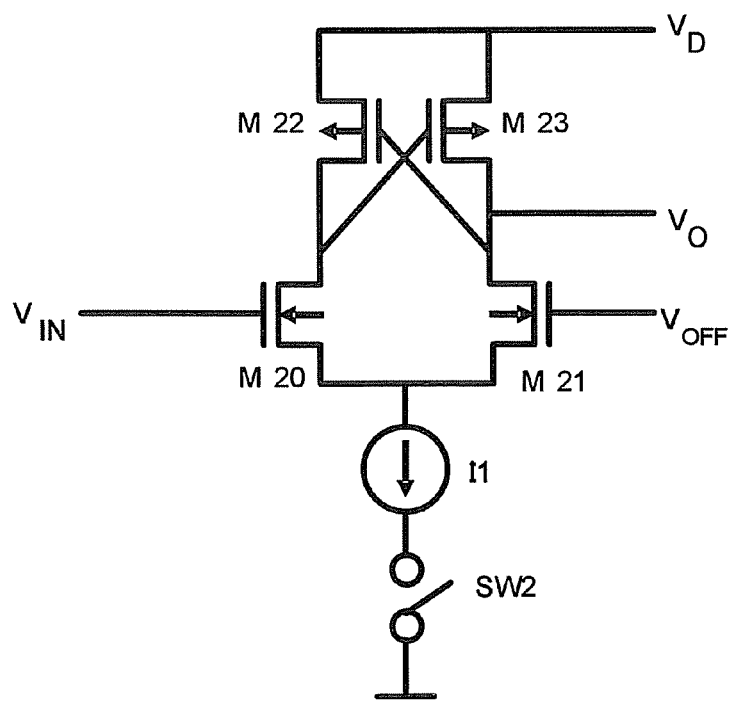
FIG. 4 is a circuit diagram showing an example of a determiner 125.

FIG. 4 is a circuit diagram showing an example of the configuration of the determiner 125. The determiner 125 includes transistors M20 to M23, a current source I1, and the switch SW2. The transistors M20 and M21 constitute a differential pair. The transistors M22 and M23 are cross-coupled to the transistors M20 and M21 as loads. The switch SW2 sets connection/non-connection of the current source I1 and controlled by the controlling unit 126.

The gate terminal of the transistor M20 is an input terminal to which the output voltage from the filter 124 is inputted (an input voltage Vin). An offset voltage Voff is applied to the gate terminal of the transistor M21. The offset voltage Voff is controlled by the controlling unit 126. When H/L of the input voltage Vin is identified, the switch SW2 is conducted and the identified signal is outputted as the signal voltage Vo. When H/L of the input voltage Vin is not identified, the switch SW2 is turned off to stop the operation of the determiner 125.

Second Embodiment

Figure 5:
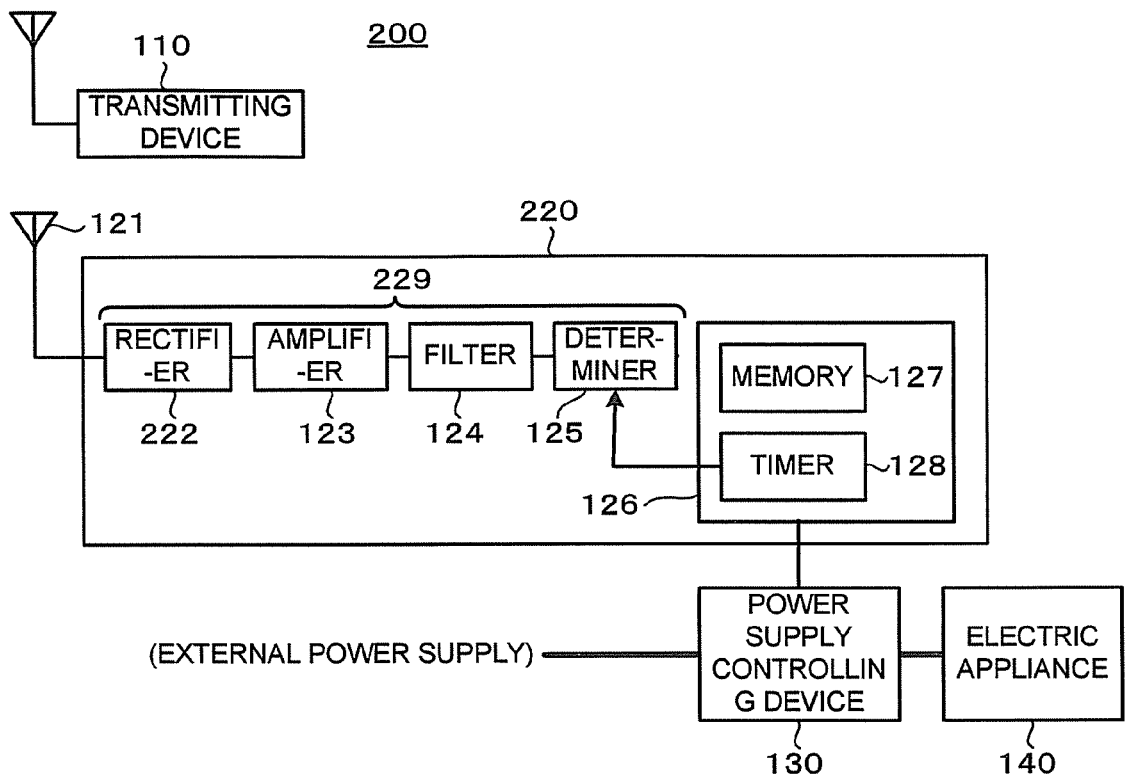
FIG. 5 is a block diagram showing an electric appliance starting system 200 according to a second embodiment.

FIG. 5 is a block diagram showing an electric appliance starting system 200 according to a second embodiment of the present invention. The electric appliance starting system 200 includes a transmitting device 110, a receiving device 220, a power supply controlling device 130, and an electric appliance 140. The receiving device 220 includes an antenna 121, a rectifier 222, an amplifier 123, a filter 124, a determiner 125, and a controlling unit 126.

In the electric appliance starting system 200, the rectifier 122 has been changed with the rectifier 222 as compared to the electric appliance starting system 100. The rectifier 222 has a gain control function. In the electric appliance starting system 200, the gain can be controlled using both the rectifier 222 and the amplifier 123. Alternatively, the gain may be controlled using only the rectifier 25. The gain is reduced when the offset voltage of the determiner 125 is saturated, as in the electric appliance starting system 100.

Here, the reception sensitivity (S (Signal)/N (Noise) ratio) can be made higher by the gain control in the rectifier 222 than by the gain control in the amplifier 123 of the electric appliance starting system 100. This will be described below.

Figure 6:
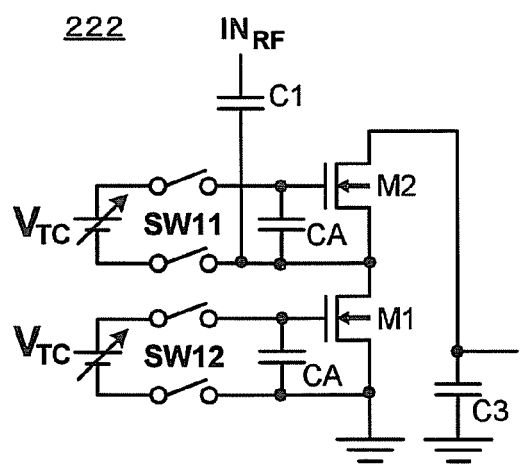
FIG. 6 is a circuit diagram showing an example of a rectifier 222.

FIG. 6 is a circuit diagram showing an example of the rectifier 222. The rectifier 222 is different from the rectifier 122 in that the voltages VTC of the voltage sources VTC are variable. As a result, the gain can be controlled.

The threshold values of the transistors M1 and M2 are set to VTH. It is assumed that the RF signal (the reception signal) inputted from the RF terminal $IN_{RF}$ is an unmodulated carrier signal (a sine wave), the rectifier 222 outputs a positive component of the sine wave. Here, the voltage of the direct-current signal outputted from the rectifier 222 changes according to the magnitude of the threshold values VTH of the transistors M1 and M2.

Figure 7:
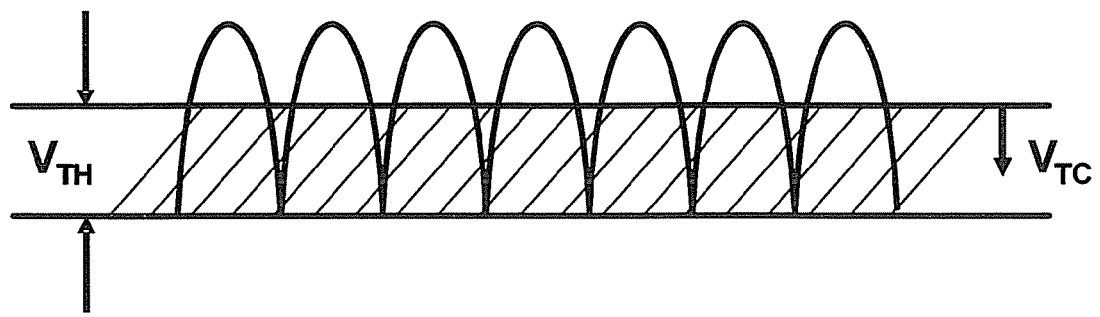
FIG. 7 is a chart showing a signal rectified in the rectifier 222.

FIG. 7 is a chart showing the signal rectified in the rectifier 222. For example, when the threshold value VTC is set to 0 V, a portion with hatchings in FIG. 7 is not outputted from the rectifier 222, but a portion obtained by removing the portion with hatchings from the positive component of the sine wave is outputted. In contrast, when setting is made such that VTC=VTH, the whole positive component of the sine wave will be rectified. Thus, it is found that the conversion gain (the rectifying efficiency, the gain) of the rectifier 222 is increased by matching VTC with VTH.

Figure 8:
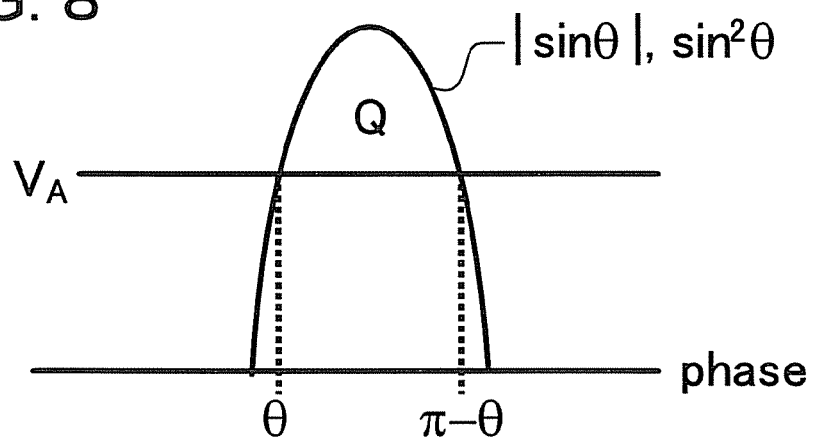
FIG. 8 is a chart illustrating a half cycle of an unmodulated interference wave.

Next, the relation between the gains of the interference wave and the desired wave when an interference wave larger than the desired wave reaches will be described. FIG. 8 is a chart illustrating a half cycle of the unmodulated interference wave. The horizontal axis indicates the phase and the vertical axis indicates the amplitude. The boundary voltage between a portion outputted from the rectifier 222 (a portion Q) and the portion not outputted is VA. The maximum voltage of the boundary voltage VA is set as VTH. Note that the amplitude is normalized by VTH and the maximum value of the boundary voltage VA is 1. When the boundary voltage VA has the maximum value (1), the area $S_Q$ of the portion Q is 0.

Here, the gain when predetermined threshold value compensation is performed is obtained on the basis of the state where the control voltage VTC is made equal to the threshold value VTH (VTC=VTH), that is, the state where the area $S_Q$ of the portion Q is 0. $\theta = \sin^{-1}$ VA, and the area $S_Q$ of the portion Q is substantially the same as a value obtained by subtracting VA*$(\pi - 2\cdot\theta)$ from the area of $\sin\theta$ in a section of the phase from $\theta$ to $(\theta - \pi)$. When the boundary voltage VA is 0, the area $S_Q$ of the portion Q is 2.

Figure 9:
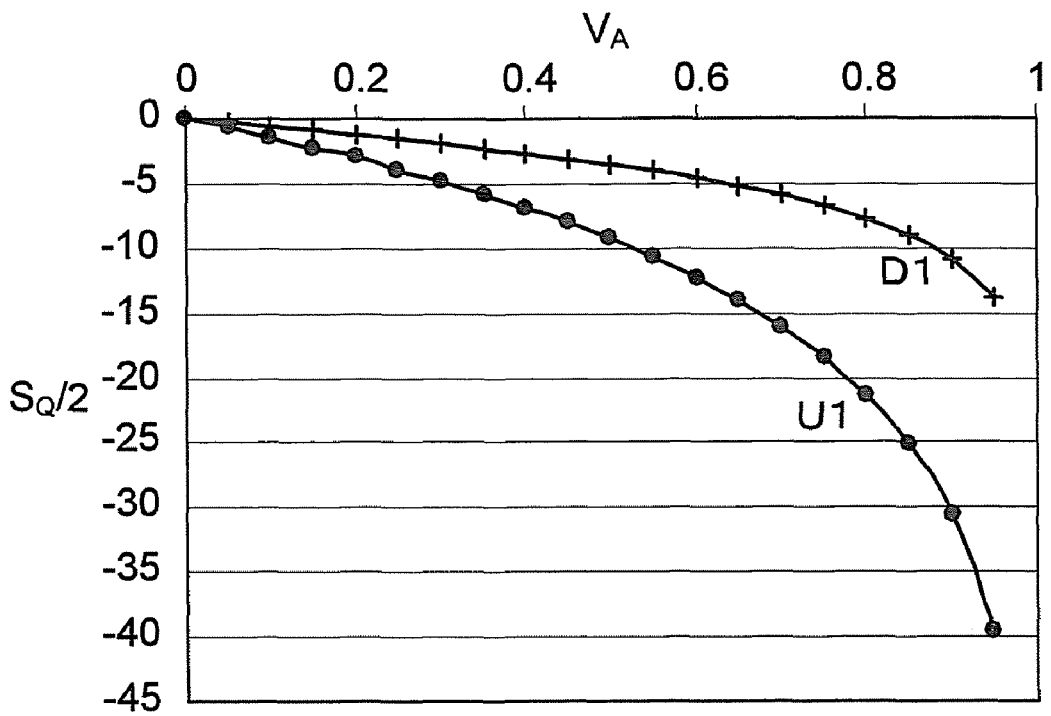
FIG. 9 is a graph showing an example of the relation between (the area of a portion Q)/2 and a boundary voltage VA about an interference wave and a desired wave.

FIG. 9 is a graph showing an example of the relation between (the area $S_Q$ of the portion Q)/2 and the boundary voltage VA about the interference wave and the desired wave. In this graph, the horizontal axis indicates the value of VA and the vertical axis logarithmically indicates (the area $S_Q$ of the portion Q)/2. Lines U1 and D1 show the interference wave and the desired wave, respectively.

It is assumed that the desired wave transmitted together with the interference wave is smaller than the interference wave. In this case, the signal is transmitted in a section of the boundary voltage VA or higher, that is, a section of $(\pi - 2\theta)$, whereas the signal is discarded in a section of $2\theta$. Accordingly, the gain can be approximated by $[(\pi - 2\theta)/\pi]$.

As is clear from FIG. 9, the attenuation of the desired wave D1 is less than the attenuation of the interference wave This means that the interference wave can be suppressed more than the desired wave as well as that the gain can be controlled by shifting the threshold value. As compared to the prior art in which the desired wave and the interference wave similarly attenuate, the sensitivity of the desired wave and thus the S/N ratio will be improved by using this technique.

Figure 10:
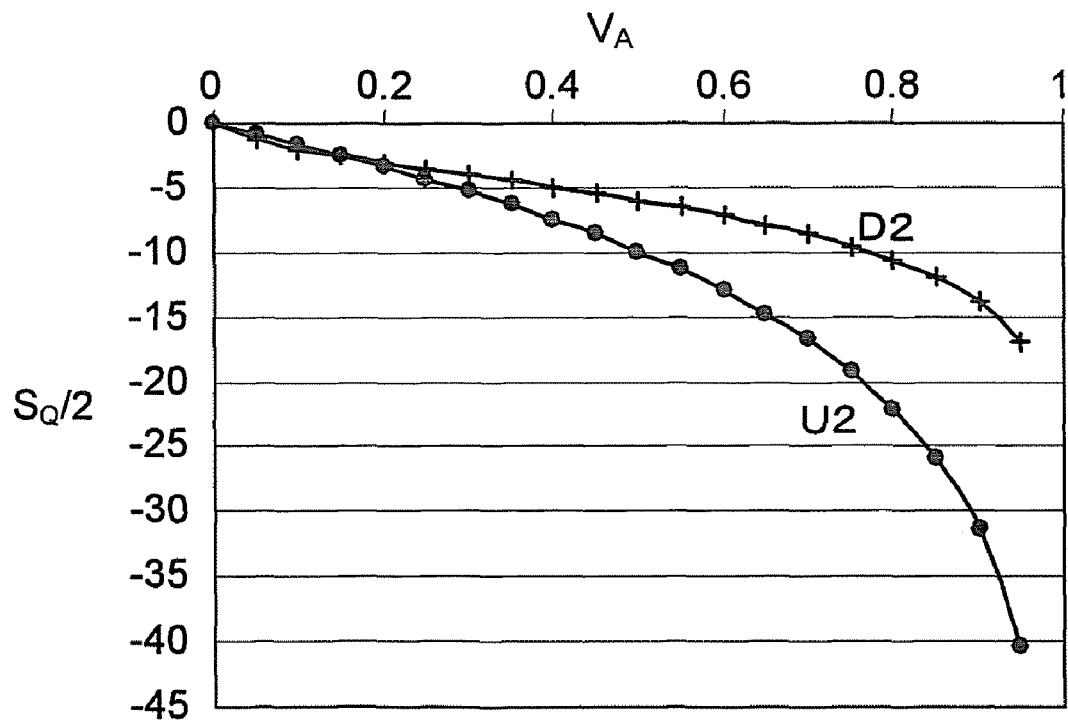
FIG. 10 is a graph showing an example of the relation between (the area of the portion Q)/2 and the boundary voltage VA about the interference wave and the desired wave.

Similarly, a graph showing an example of the relation between (the area $S_Q$ of the portion Q)/2 and the boundary voltage VA when the characteristics of the rectifier 222 is $y = x^2$ is shown in FIG. 10. It is found that FIG. 10 indicates similar characteristics to those in FIG. 9.

As described above, it is found that the interference wave is greatly suppressed in both cases where it is assumed that the characteristics of the rectifier 222 are $y = |x|$ and $y = x^2$. Therefore, the control of the gain by the rectifier 222 is effective for suppression of the interference wave. The gain can be controlled by changing the control voltage VTC.

Note that the timing to change the control voltage VTC is the time when the compensation voltage of the determiner 125 is saturated by the interference wave. The concrete control sequence will be described later.

(Operation Procedure of Electric Appliance Starting System 100, 200)

As has been described, in the electric appliance starting system 100, 200, a gain control mechanism is included as the amplifier 123 and the rectifier 122 or 222. As a result, sensing of the desired wave (the desired signal) is possible even when the interference wave exists. Hereinafter, the sequence of gain control will be described.

Figure 11:
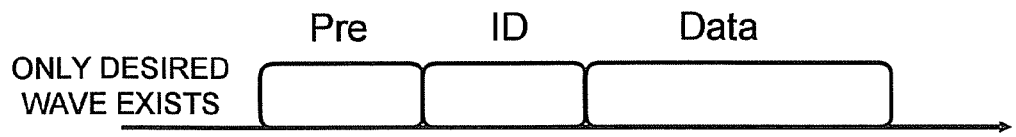
FIG. 11 is an illustration showing an example of the radio wave state in the electric appliance starting system 100, 200.
Figure 12:
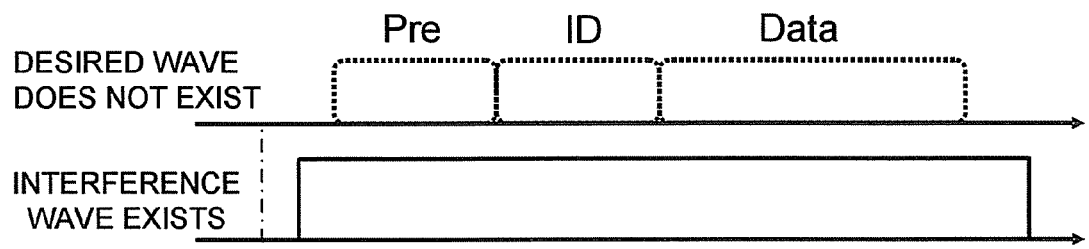
FIG. 12 is an illustration showing an example of the radio wave state in the electric appliance starting system 100, 200.
Figure 13:
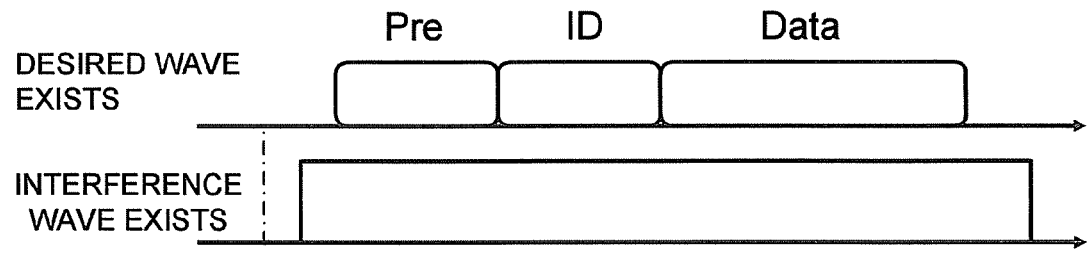
FIG. 13 is an illustration showing an example of the radio wave state in the electric appliance starting system 100, 200.

FIG. 11 to FIG. 13 separately show radio wave states (the desired wave, the interference wave) in the electric appliance starting system 100, 200. As shown in FIG. 11 to FIG. 13, the following cases are considered as the radio wave state: a case (1) where only the desired wave exists, a case (2) where only the interference wave exists, and a case (3) where both the desired wave and the interference wave exist.

It is assumed that the desired wave is in a format including a preamble, ID information, and data. The preamble (Pre) indicates the section of the ID information and the section of the data. Note that if the receiving device 120, 220 has information of these sections, the preamble can be omitted. The information of ID is the identifier identifying the electric appliance 140 or the receiving device 120. The start signal includes the information of ID.

Figure 14:
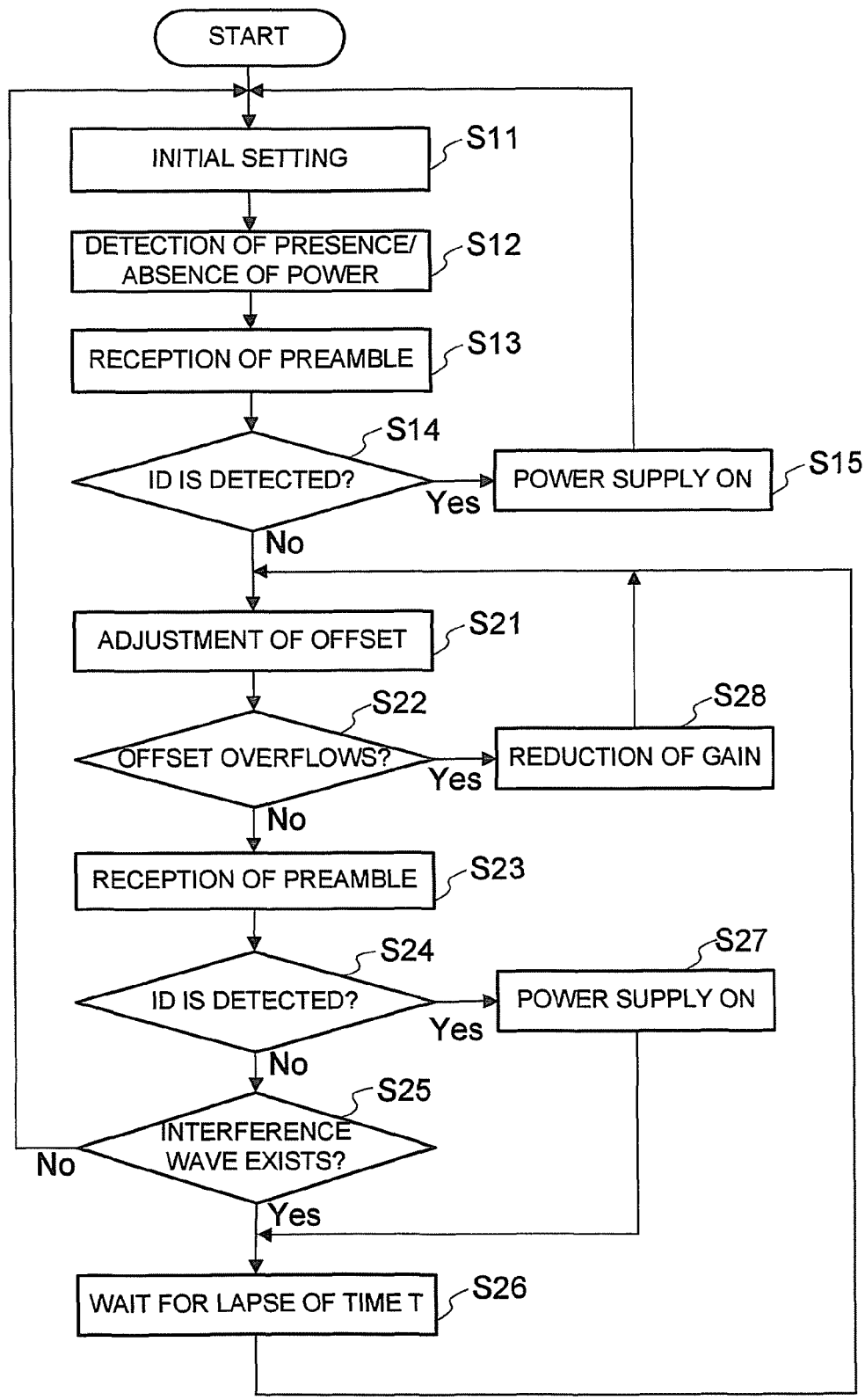
FIG. 14 is a flowchart illustrating an example of the operation procedure of the electric appliance starting system 100, 200.

FIG. 14 is a flowchart illustrating an example of the operation procedure of the electric appliance starting system 100, 200.

(1) Initial Setting (Step S11)

A parameter is set to the initial value. As the initial setting, the followings are assumed. The gains of the amplifier 123 and the rectifier 222 are maximized to make it possible to receive the desired wave with good sensitivity. Further, the determiner 125 is set so that the offset voltage of the whole circuit can be compensated.

(2) Detection of Presence/Absence of Power (Step S12)

The rectifier 122 or the rectifier 222 rectifies the radio wave reached thereto. As a result, a signal is transmitted to the input of the determiner 125 via the amplifier 123 and the filter 124.

The determiner 125 detects signals at predetermined time intervals. The predetermined time intervals are managed by the timer 128. By conducting the switch SW2 of the determiner 125 at the predetermined time intervals, the signals can be detected. The operation thus far corresponds to the detection of presence/absence of power.

(3) Reception of Preamble (Step S13)

Then, the preamble is received. When there is no interference wave and therefore the desired wave is received in a good condition, the preamble is received so that the section of ID information and the section of data can be recognized. In contrast, in the case of only the interference wave, the preamble is not received. Further, also in the case where the interference wave and the desired wave are simultaneously received, the preamble may not be received.

The procedure proceeds to detection of ID irrespective of the presence/absence of reception of preamble. More specifically, even when the preamble is not received, the procedure proceeds to detection of ID in Step S14 without waiting for reception of preamble. This is because waiting for reception of preamble stops the processing here and it becomes difficult to proceed to adjustment of the offset voltage.

(4) Detection of ID (Step S14)

It is determined whether or not the ID stored in the memory 127 coincides with the ID obtained from the received signal (detection of ID). When there is no interference wave and the desired wave is received in a good condition, an ID is detected. In contrast, when the interference wave reaches (when only the interference wave is received, when the interference wave and the desired wave are simultaneously received), no ID may be detected. Note that when no preamble is received in Step S13, generally no ID will be detected in Step S14.

(5) Power Supply ON (Step S15)

When the ID is detected, the power supply of the electric appliance 140 is turned on via the power supply controlling device 130. Thereafter, data subsequent to the ID is read. After completion of read of the data, the procedure returns to the mode of detecting the presence/absence of power.

(6) Adjustment of Offset Voltage (Step S21)

When no ID is detected (when the interference wave reaches), the procedure proceeds to adjustment of the offset voltage. In other words, the offset voltage of the determiner 125 is adjusted. In this event, the offset voltage can be changed based on the strength of the reception signal (here, the interference wave). For example, the offset voltage is changed so that the offset voltage is increased as the strength of the reception signal increases.

(7) Judgment of Presence/Absence of Overflow of Offset Voltage (Step S22)

It is judged whether or not the offset voltage overflows. More specifically, when the value of the offset voltage is at the upper limit, the offset voltage is judged to overflow, and when the value is less than the upper limit, the offset voltage is judged not to overflow. When the interference wave is small, the offset voltage of the determiner 125 never overflows even if the gain is set to the maximum.

(8) Reception of Preamble and Detection of ID (Steps S23 and S24)

When the preamble is received in the state where the offset voltage does not overflow, the procedure is brought again to the mode of detecting the ID. Namely, the presence/absence of detection of ID is judged. In this event, no ID is detected in the case of only the interference wave, as in Step S13.

When the ID is detected, the power supply of the electric appliance 140 is turned on via the power supply controlling device 130 as in Step S15. Thereafter, the data subsequent to the ID is read. After completion of read of the data, the procedure proceeds to Step S26.

(9) Judgment of Presence/Absence of Interference Wave (Steps S25 and S26)

The presence/absence of the interference wave is judged. The difference (Voff1−Voff0) between the initial value of the offset voltage (Voff0) and the offset voltage at presently set (Voff1) is calculated. When the difference (Voff1−Voff0) does not exceed a predetermined value Y, it is judged that there is no interference wave (the interference wave is negligible). When the difference exceeds the predetermined value Y, it is judged that there is an interference wave.

When it is judged that there is no interference wave, the procedure proceeds to detection of the presence/absence of power at the initial setting. In contrast, when it is judged that there is an interference wave (when the difference between the initial value of the offset voltage and the set offset voltage exceeds the predetermined value Y), this state is maintained for a predetermined time T. During this time, detection of ID is performed if there is a signal which can be recognized as the preamble. If there is no signal which can be recognized as the preamble, the procedure proceeds to adjustment of the offset voltage after the predetermined time T.

(10) Reduction of Gain (Step S28)

When it is judged that, for example, the power of the interference wave is high and the offset voltage overflows in Step S22, the procedure proceeds to the mode of reducing the gain. The way to reduce the gain is implemented such that a predetermined amount of gain is reduced with respect to the present gain. For instance, all of set gains are stored in the memory 127, and control is conducted in a manner that the gain is sequentially reduced.

After the gain is reduced by the predetermined amount, adjustment of the offset voltage is performed again. If the offset voltage overflows, the gain is reduced in sequence until the offset voltage no longer overflows. When the offset voltage no longer overflows, the procedure proceeds to reception of preamble. Subsequently, the same operation as that when the interference wave is small is performed. When the interference wave no longer exists, the difference with respect to the initial value of the offset voltage becomes equal to or less than the predetermined value Y, so the procedure returns to the initial mode of detecting the presence/absence of power.

The above procedure will be described separately in the case where only the interference wave is received and the case where the interference wave and the desired wave are simultaneously received.

A. Case Where Only the Interference Wave is Received

Hereinafter, the case where only the interference wave is received will be described.

In the case where only the interference wave is received, no ID is detected (Step S13), so the offset voltage is adjusted. In this event, if the interference wave is relatively small, the offset voltage of the determiner 125 does not overflow (Step S22). As described above, when the interference wave is received, the offset voltage is adjusted to correspond to the strength of the interference wave.

In Step S22, for example, when it is judged that the power of the interference wave is large and the offset voltage after the adjustment overflows, the gain is reduced (Step S28) and thereafter the offset voltage is adjusted again (Step S21). The gain is reduced until the offset voltage no loner overflows. As described above, even when the interference wave having the strength which cannot be dealt with only by changing the offset voltage is received, the strength of the interference wave can be dealt with by adjusting the gain.

In the case where only the interference wave is received, the ID cannot be detected also in Step S24 as in Step S13. For this reason, the power supply of the electric appliance 140 is maintained in the OFF state (Step S27).

When it is judged that there in no interference wave (for example, when the communication on the mobile phone is finished) in Step S25, the procedure proceeds to detection of the presence/absence of power at the initial setting. In contrast, when it is judged that there is an interference wave (when the difference between the initial value of the offset voltage and the set offset voltage exceeds the predetermined value Y), this state is maintained for the predetermined time T.

B. Case Where Interference Wave and Desired Wave are Simultaneously Received

The case where the interference wave and the desired wave are simultaneously received will be described.

Also in the case where the interference wave and the desired wave are simultaneously received, the ID cannot be detected due to the interference wave (Step S13), so the offset voltage may be adjusted (Step S21). In this event, if the interference wave is relatively small, the offset voltage of the determiner 125 does not overflow (Step S22). As described above, even when the interference wave and the desired wave are received, the offset voltage is adjusted to correspond to the strength of the interference wave.

When it is judged that, for example, the power of the interference wave is high and the offset voltage after the adjustment overflows in Step S22, the gain is reduced (Step S28) and thereafter the offset voltage is adjusted again (Step S21). The gain is reduced until the offset voltage no loner overflows. As described above, even when the desired wave and the interference wave having the strength which cannot be dealt with only by changing the offset voltage are received, the strength of the interference wave can be dealt with by adjusting the gain.

In the case where the interference wave and the desired wave are simultaneously received, the ID can be detected in Step S24. If the ID is detected, the power supply of the electric appliance 140 is turned on via the power supply controlling device 130, so that data communication is performed (Step S27). After completion of the data communication, the operation is performed in this state for the predetermined time T (Step S26). If the preamble signal is received again during this time, the ID will be detected.

When it is judged that there in no interference wave (for example, when the communication on the mobile phone is finished) in Step S25, the procedure proceeds to detection of the presence/absence of power at the initial setting.

Figure 15:
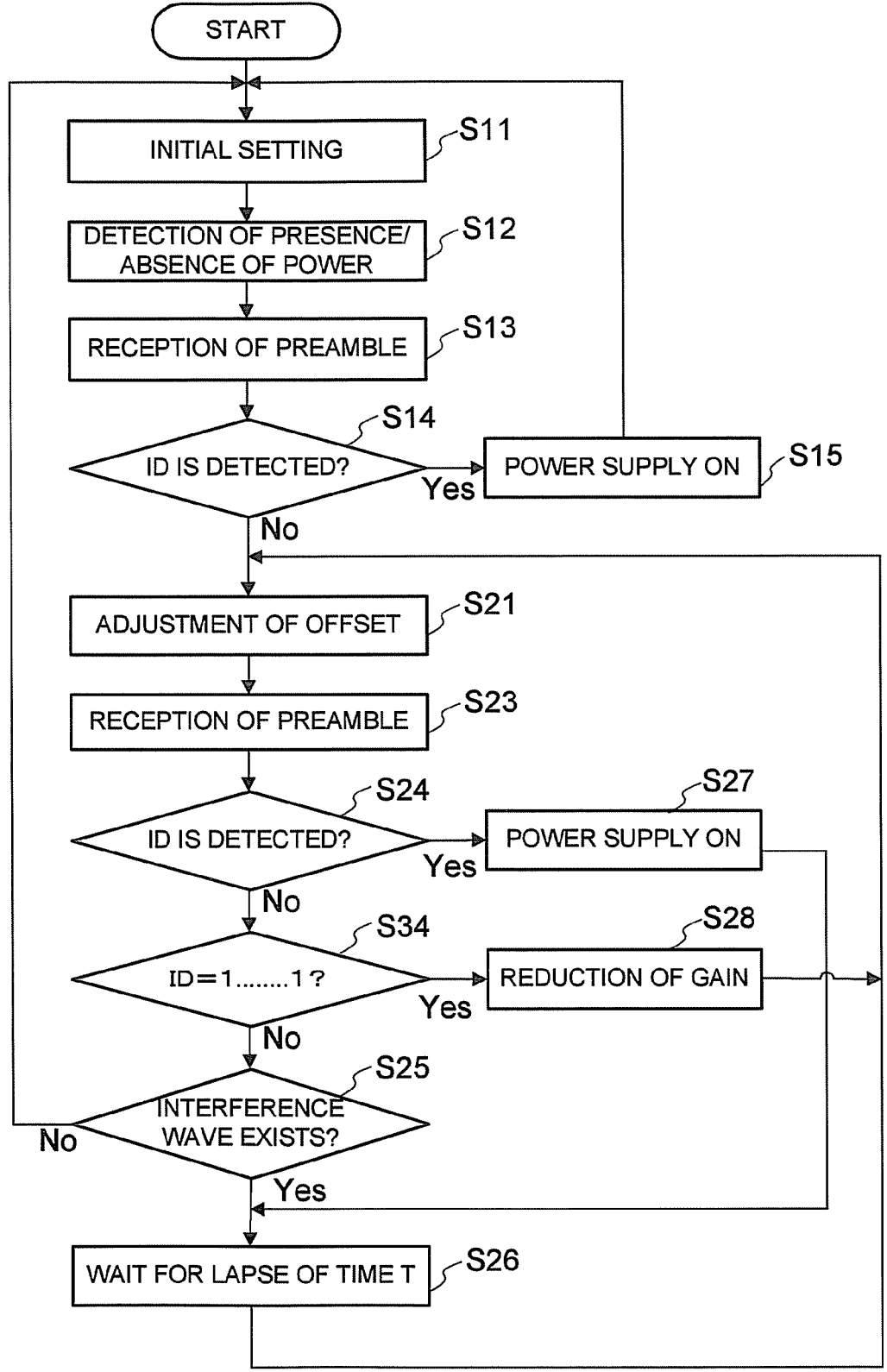
FIG. 15 is a flowchart illustrating an example of the operation procedure of the electric appliance starting system 100, 200.

FIG. 15 is a flowchart illustrating an example of the operation procedure of the electric appliance starting system 100, 200. As compared to the procedure in FIG. 14, Step S22 is omitted and Step S34 is added in the procedure in FIG. 15. FIG. 14 and FIG. 15 are difference in the procedure of detecting overflow. Namely, the overflow is judged by the offset voltage in FIG. 14. On the hand, the overflow is judged when the detected ID is "1 1 1 . . . " in FIG. 15. The procedure in FIG. 15 requires more time for adjustment of the gain because the gain is reduced after the detection of ID, as compared to the procedure in FIG. 14. However, the procedure in FIG. 15 is applicable to the application which is not required to perform quick response.

Figure 16:
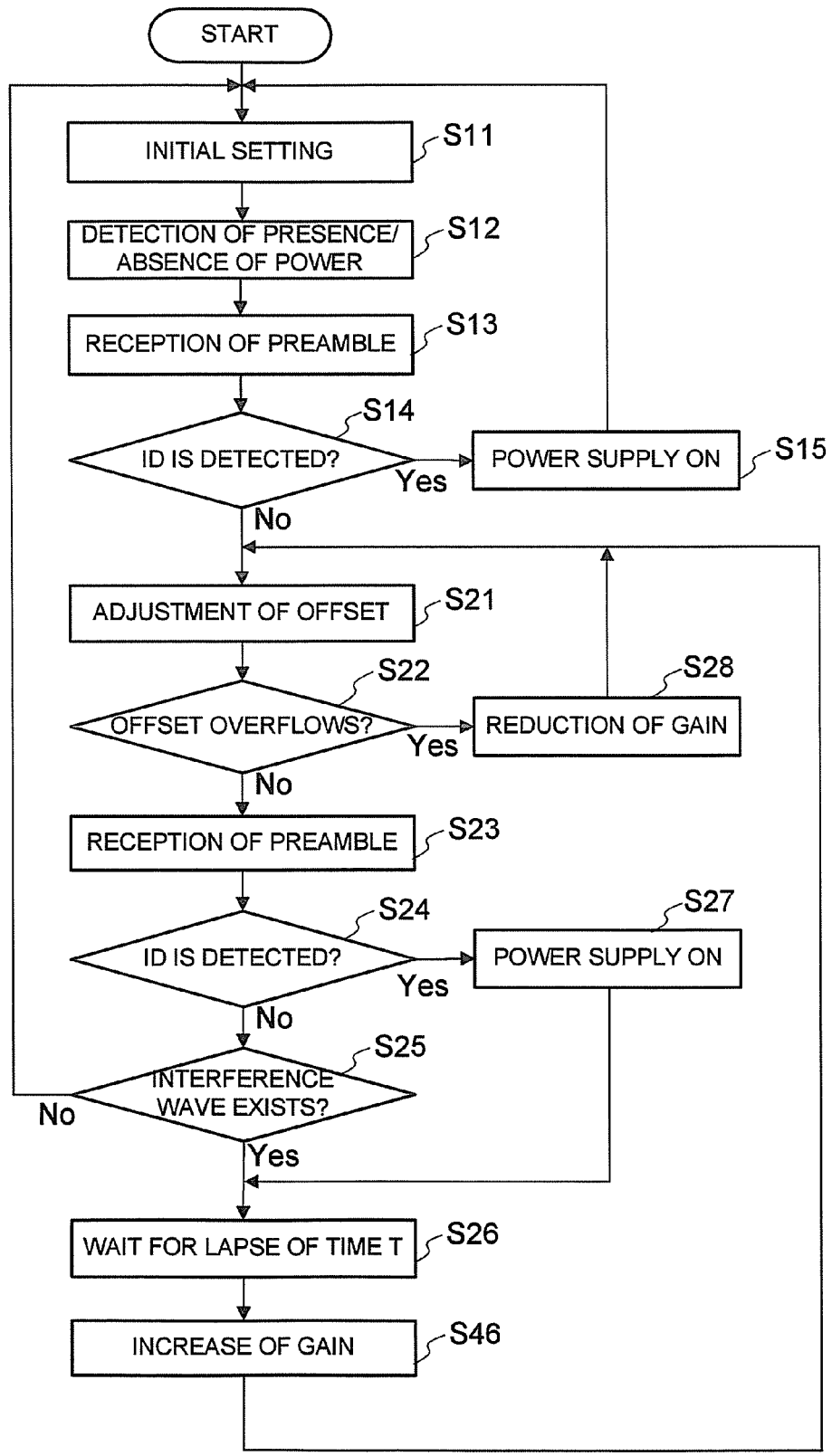
FIG. 16 is a flowchart illustrating an example of the operation procedure of the electric appliance starting system 100, 200.

FIG. 16 is a flowchart illustrating an example of the operation procedure of the electric appliance starting system 100, 200. As compared to the procedure in FIG. 14, Step S46 is added in the procedure in FIG. 16. Namely, the state is maintained for the predetermined time T (Step S26), and then the gain is brought to the maximum value, that is, the initial state, before the adjustment of the offset voltage (Step S46). Performance of the above procedure makes it possible not only to reduce the gain but also to increase it after the reduction.

Other Embodiments

Embodiments of the present invention are not limited to the above-describe embodiment, but can be extended or changed, and the extended and changed embodiments are also included in the technical scope of the present invention.

What is claimed is:

1. A starting apparatus, comprising:
   a storage unit storing an identifier;
   a rectifying unit rectifying a reception signal;
   a generating unit comparing the reception signal rectified in said rectifying unit to a reference signal and generating a digital signal from the reception signal;
   a judging unit judging whether or not the digital signal contains information of the identifier;
   a reference changing unit changing the reference signal when the judging unit judges that the reception signal does not contain information of the identifier; and
   a start instructing unit instructing start of an electric appliance when the judging unit judges that the reception signal contains information of the identifier.

2. The apparatus according to claim 1, further comprising:
   an amplifying unit amplifying the reception signal rectified in the rectifying unit,
   wherein the generating unit compares the reception signal amplified in the amplifying unit to the reference signal and generates the digital signal.

3. The apparatus according to claim 2,
wherein a gain of the amplifying unit or the rectifying unit is variable.

4. The apparatus according to claim 3, further comprising:
a gain reducing unit reducing the gain of the amplifying unit or the rectifying unit when a strength of the reference signal changed by the reference changing unit is equal to or greater than a predetermined value.

5. The apparatus according to claim 3, further comprising:
a gain reducing unit reducing the gain of the amplifying unit or the rectifying unit when a predetermined number or more of High states of the digital signal continue.

6. The apparatus according to claim 3,
wherein the rectifying unit comprises:
a first FET having a first gate terminal and a first source terminal to which the reception signal is applied;
a second FET having a second gate terminal, a second source terminal, and a drain terminal connected to the first source terminal;
a first voltage applying unit applying a first control voltage between the first gate terminal and the first source terminal; and
a second voltage applying unit applying a second control voltage between the second gate terminal and the second source terminal,
wherein the gain of the rectifying unit is changed by adjusting the first and second control voltages.

7. The apparatus according to claim 1,
wherein the reference changing unit repeatedly changes the reference signal.

8. The apparatus according to claim 7,
wherein the repeat of change of the reference signal by the reference changing unit is stopped when a strength of the reference signal changed by the reference changing unit is less than a predetermined second value.

9. The apparatus according to claim 7, further comprising:
a gain increasing unit increasing the gain of the amplifying unit or the rectifying unit when a strength of the reference signal changed by the reference changing unit is greater than a predetermined second value,
wherein the gain of the amplifying unit or the rectifying unit is variable.

10. The apparatus according to claim 9,
wherein the reference changing unit changes the reference signal after the gain is increased by the gain increasing unit.

11. A starting method, comprising:
rectifying a reception signal;
comparing the rectified reception signal to a reference signal and generating a digital signal from the reception signal;
judging whether or not the digital signal contains information of a predetermined identifier;
changing the reference signal when it is judged that the reception signal does not contain information of the identifier; and
instructing start of an electric appliance when it is judged that the reception signal contains information of the identifier.

12. The method according to claim 11, further comprising:
amplifying the rectified reception signal,
wherein the generating step compares the amplified reception signal to the reference signal and generates a digital signal from the reception signal.

13. The method according to claim 12,
wherein a gain in the amplifying step or the rectifying step is variable.

14. The method according to claim 13, further comprising:
reducing the gain in the amplifying step or the rectifying step when a strength of the reference signal changed in the changing step is equal to or greater than a predetermined value.

15. The method according to claim 13, further comprising:
reducing the gain in the amplifying step or the rectifying step when a predetermined number or more of High states of the digital signal continue.

16. The method according to claim 11,
wherein the changing step repeatedly changes the reference signal.

17. The method according to claim 16,
wherein the repeat of change of the reference signal is stopped when a strength of the reference signal changed in the changing step is less than a predetermined second value.

18. The method according to claim 16, further comprising:
increasing the gain in the amplifying step or the rectifying step when a strength of the reference signal changed in the changing step is greater than a predetermined second value,
wherein the gain in the amplifying step or the rectifying step is variable.

19. The method according to claim 18,
wherein the reference signal is changed after the gain is increased in the increasing step.

* * * * *